United States Patent [19]

Tsutsumi

[11] 4,059,383
[45] Nov. 22, 1977

[54] MOLD OPENING AND LOCKING MECHANISM IN AN INJECTION MOLDING MACHINE OR THE LIKE

[76] Inventor: Shigeru Tsutsumi, No. 1165, Toyamacho, Yonezawa, Yamagata, Japan

[21] Appl. No.: 595,980

[22] Filed: July 14, 1975

[30] Foreign Application Priority Data

July 17, 1974 Japan .................................. 49-81175

[51] Int. Cl.² ............................................. B29C 1/16
[52] U.S. Cl. ............................ 425/451.6; 425/450.1; 425/451.9; 425/DIG. 221
[58] Field of Search ............... 425/451.2, 450.1, 451.4, 425/451.5, 451.6, 451.7, 451.9, DIG. 221, DIG. 223, 249

[56] References Cited

U.S. PATENT DOCUMENTS

| | | | |
|---|---|---|---|
| 2,689,978 | 9/1954 | Roger | 425/DIG. 223 |
| 2,862,238 | 12/1958 | Cuzzi | 425/451.2 |
| 2,916,768 | 12/1959 | Quere et al. | 425/451.2 |
| 2,976,569 | 3/1961 | Quere et al. | 425/DIG. 221 |
| 3,120,039 | 2/1964 | Stubbe et al. | 425/DIG. 223 |
| 3,507,012 | 4/1970 | Aoki | 425/249 |
| 3,669,599 | 6/1972 | Snider et al. | 425/451.2 |
| 3,716,323 | 2/1973 | Classen | 425/451.2 |
| 3,734,673 | 5/1973 | Paterson et al. | 425/451.2 |
| 3,768,953 | 10/1973 | Dangremond et al. | 425/451.2 |
| 3,840,313 | 10/1974 | Grondmann | 425/451.5 |
| 3,905,741 | 9/1975 | Poncet | 425/DIG. 221 |

FOREIGN PATENT DOCUMENTS

| | | | |
|---|---|---|---|
| 2,967,468 | 12/1968 | Japan | 425/451.2 |
| 317,534 | 12/1969 | U.S.S.R. | 425/451.6 |

Primary Examiner—Francis S. Husar
Assistant Examiner—W. R. Briggs
Attorney, Agent, or Firm—Frank J. Jordan

[57] ABSTRACT

The present invention relates to a mold opening and locking mechanism in an injection molding machine or the like.

8 Claims, 16 Drawing Figures

MOLD OPENING AND LOCKING MECHANISM IN AN INJECTION MOLDING MACHINE OR THE LIKE

BACKGROUND OF THE INVENTION

In a the mold opening and locking mechanism in an injection molding machine or the like there is provided a pair of molds consisting of a fixed mold and a movable mold. The former is supported by a fixed plate and the latter is supported by a movable plate. When molding is effected during locking of the mold, the movable mold must be locked firmly to the fixed mold so as to be prevented from moving away from the fixed mold. The disadvantage in conventional mold opening and locking mechanisms is that, when producing larger-sized molded articles, a mold opening and locking mechanism of larger size is required. As a result, a hydraulic means and a toggle means are by necessity required to be designed larger in size. The present invention seeks to eliminating the aforegoing disadvantage.

SUMMARY OF THE INVENTION

The prime object of the invention is to provide a mold opening and locking mechanism in an injection molding machine or the like which is able to carry out a smooth to and fro movement of the movable mold by use of a small-sized hydraulic means as well as a small-sized toggle means and to effect a perfect locking of a pair of molds by locking four tie bars with a preferred locking means at the time of the mold locking. In this type of the mold opening and locking mechanism a powerful clamp for the two molds is required. Particularly, because the two molds are brought into contact with each other through guide pins, it is not easy to move the movable mold away from the fixed mold. In addition, there is a disadvantage in that the existence of a molded article within the molds makes it difficult to separate the movable mold from the fixed mold. The present invention has eliminated such disadvantages.

Another object of the invention is to provide a mold opening and locking mechanism in an injection molding machine or the like which is able to carry out a smooth and effective mold opening by locking the tie bars with a preferred locking means at the time of the mold opening.

Another object of the invention is to provide a mold opening and locking mechanism in an injection molding machine or the like which is able to carry out a speedy and smooth operation of the mold opening and locking.

Further, another object of the invention is to provide a mold opening and locking mechanism which is applicable not only to an injection molding machines, but also to various types of die casting machines, press machine and so forth.

These and other features and advantages of the invention will be understood from the following description in conjunction with the accompanying drawings.

BRIEF DESCRIPTION OF THE DRAWING

FIGS. 1A to 6A are side views looking from the left hand of FIGS. 1-6 respectively.

DETAILED DESCRIPTION OF THE INVENTION

Figure 1A:
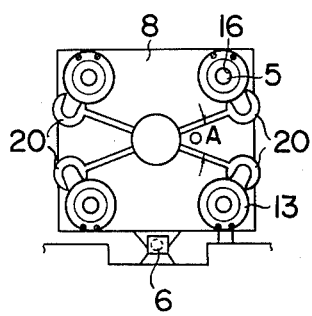

Numeral 1 denotes a fixed mold supported by a fixed plate 2. Numeral 3 denotes a movable mold movable into contact with or movable away from the fixed mold. The movable mold 3 is supported by a movable plate 4. Thus, a pair of molds a is provided. Numeral 5 denotes one of four tie bars of which the end is fixed to the fixed plate 2 and of which the other end is in a free state. The four tie bars 5 pass through the movable plate 4 which is linked with and supported by a piston rod 7 in a mold opening and locking cylinder 6. Therefore, the movable plate 4 which is movable by extension of the piston rod 7 is guided by the tie bars 5, and thereby is able to contact with or separate from the fixed plate 2. The mold opening and locking cylinder 6 is provided with a variable valve at the oil inlet thereof, and by actuating a cam or the like the oil flow inlet thereof, and by actuating a cam or the like the oil flow can be increased or reduced. Accordingly, the piston rod 7 can be actuated with a lower speed and safely so that the external face of the movable mold 4 will not collide strongly with that of the fixed mold 1. It is desirable to install such an additional device at the cylinder 6 in order to assure that the two molds will make contact safely.

A rear plate 8 which is placed behind the movable plate 4 is linked with the movable plate 4 by an actuating means such as a toggle means 11 which is linked with a piston rod 10 movable back and forth within a small-sized disk-type cylinder 9 for the mold locking which is provided in the rear plate 8. Numeral 12 denotes a lock adjusting member which is screwed to a free end of each of the four tie bars 5. Numeral 13 denotes an annular supporting panel which is connected to the rear plate 8 by means of a pin 14. Numeral 15 denotes an opening in the rear plate 8. Numeral 16 denotes an opening in the annular supporting panel 13. The diameter of the openings 15,16 is larger than that of the lock adjusting member 12. Numeral 17 denotes a front gap between the rear plate 8 and the lock adjusting member 12 which is formed at the time of mold locking. Numeral 18 denotes a rear gap between the annular supporting panel 13 and the lock adjusting member 12. Numeral 19 denotes a locking plate for the mold locking which can be inserted and locked in the front gap 17. Numeral 20 denotes a locking plate for the mold opening which can be inserted and locked in the rear gap 18.

Now the distance between the rear plate 8 and the annular supporting panel 13 is regarded as L, the thickness of the lock adjusting member 12 as $l$ and the thickness of the two locking plates 19 and 20 as $P_1$ and $P_2$ respectively.

Then, the following formula is given.

$$L > l + P_1 + P_2$$

That is, $$L = l + P_1 + P_2 + a \qquad (I)$$

Preferably, the value of $a$ should be given at minimum.

Now an example of the mold opening and locking will be described with reference to the accompanying drawings. The locking plates 19, 20 are axially mounted for rotation in respective planes parallel to the surface of the rear plate 8. Due to means 21 for interlocking with a horizontal movement of the piston rod 10 within the cylinder 9, the locking plates 19, 20 are actuated alternately, that is, the locking plate 19 for the mold locking is inserted and locked in the front gap 17, while the locking plate 20 for the mold opening is inserted and locked in the rear gap 18.

When the toggle means 11 starts to be actuated for the mold locking, due to the interlocking means 21 the locking plate 19 is inserted in the front gap 17 whereby the rear plate 8 is locked by the lock adjusting member 12 of the tie bars 5. Thus, by expanding the toggle means 11 the two molds 1 and 3 can be clamped firmly between the fixed plate 2 and the movable plate 4. On the other hand, by releasing the toggle means 11, the piston rod 10 comes back in a reverse direction. Then, the locking plate 20 for the mold opening is inserted in the rear gap 18, and the annular supporting panel 13 and the lock adjusting member 12 of the tie bar 5 are locked by means of the locking plate 20. On the other hand, the locking plate 19 which was inserted in the front gap is released therefrom. Then, by expanding the toggle means 11 the movable plate 4 can be moved away from the fixed plate 2. This is the sequence for the mold opening.

Figure 7:
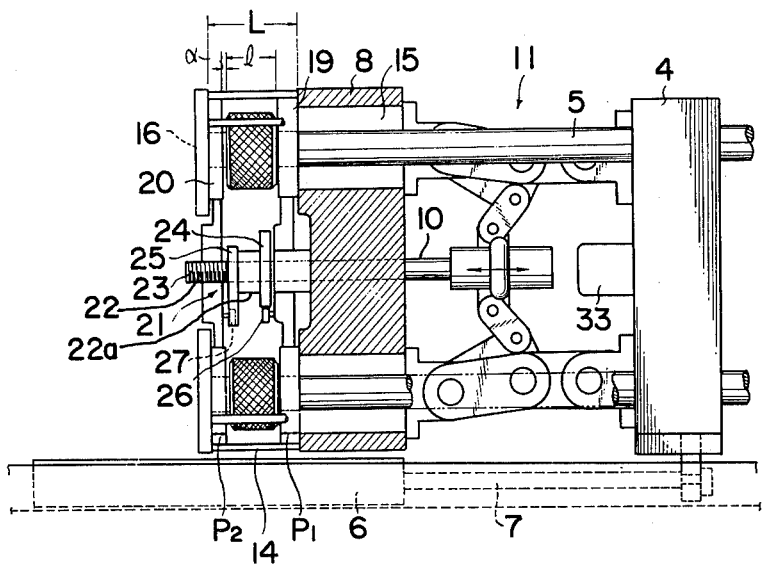
FIG. 7 is an expanded partially cutaway front view of the embodiment of FIGS. 1 to 6.
Figure 8:
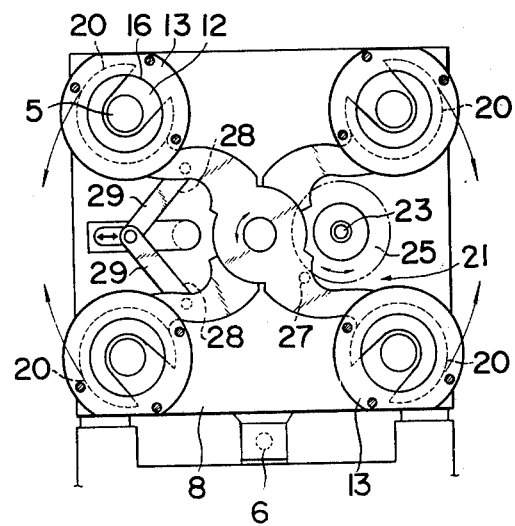
FIG. 8 is a section view seen from the left hand of the embodiment of FIG. 7.

The interlocking means 21 is not always limited to the embodiment as shown in the drawing. In FIG. 7 a worm 23 is formed on a lock actuating rod 22 cooperating with the piston rod 10. And a cam 24 for the mold locking and a cam 25 for the mold opening both of which are provided in parallel with each other by means of a nut 22a having inner thread which is engaged with the worm 23, are engageable with the cam rollers 26, 27 of the two locking plates 19, 20. Speaking more in detail, if the piston rod 10 moves back and forth, the lock actuating rod 22 also moves back and forth. By means of the resulting clockwise and anticlockwise rotation of the nut 22a engaging with the worm 23 of the lock acuating rod 22, the cam rollers 26 and 27 are moved by the cam 24 for the mold locking and the cam 25 for the mold opening respectively. Thus, the mold opening and locking is carried out.

Further, the interlocking means 21 may be also provided as an independent means without interlocking with the hydraulic means of the toggle means 11. For example, the two locking plates 19, 20 arranged transversely in relation to each other may be interlocked by means of a pair of links 29, 28 respectively.

Now the structure of the toggle means 11 will be described. Its structure is not always limited to the embodiment illustrated in the accompanying drawing. A base plate 30 connected to the front end of the piston rod 10 is linked with two middle plates 31 which are linked with two external plates 32. An end of the external plate 32 is linked with the rear plate 8, while another end thereof is linked with the movable plate 4. Numeral 33 denotes a cylinder for projecting a molded article which is provided at the back side of the movable plate 4.

The apparatus according to the present invention is fixed on a preferred base, and there are provided wheels underneath the movable plate 4 and the rear plate 8 respectively, so that they can move back and forth on the base.

Figure 1:
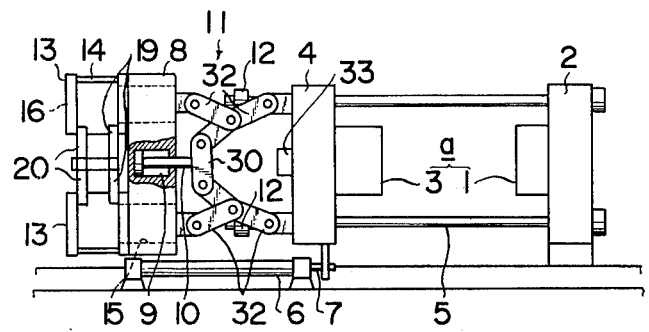
FIGs. 1 to 6 are front views illustrating operational functions of an exemplary embodiment of the mold opening and locking mechanism in an injection molding machine or the like according to the present invention.
Figure 2A:
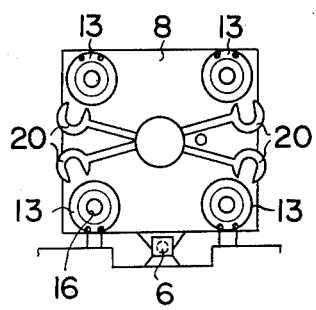
Figure 2:
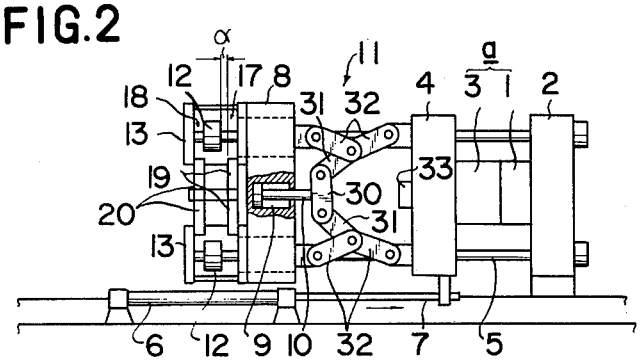
Figure 3A:
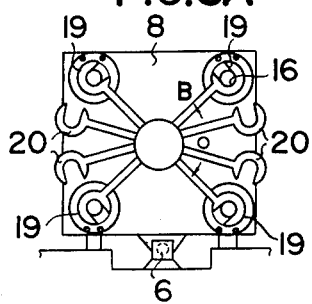
Figure 3:
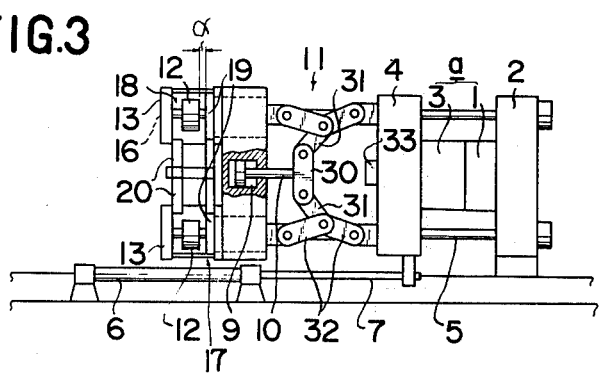
Figure 4A:
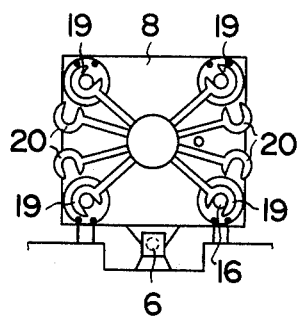
Figure 4:
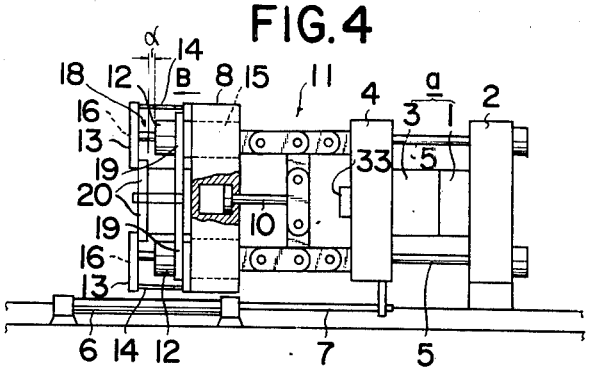

The operational function of the present invention will now be described. FIG. 1 shows a state of completion of the mold opening, that is, the movable plate 4 is placed at the furthest distance from the fixed plate 2. When the cylinder 6 for the mold opening and locking is actuated, the piston rod 7 is moved ahead. Then, the movable plate 4 advances together with the toggle means 11, the rear plate 8 and the annular supporting panel 13. The movable plate 4 stops when the two molds 1, 3 contacted each other. FIG. 2 shows a state of contacting of the pair of molds a. As described in the formula (I) mentioned previously, the thickness of the front gap 17 can be described as $P_1 + \alpha$ or the thickness $P_1$ of the locking plate 19 plus $\alpha$. When the mold locking under high pressure starts by actuating the mold locking cylinder 9, the locking plate 19 is first inserted smoothly in the front gap 17 through the interlocking means 21 by actuating the toggle means 11 and the lock actuating rod 22 (see FIG. 3). In this condition a gap $\alpha$ is formed. But as the toggle means 11 is expanded further, the rear plate 8 is moved backward by the amount $\alpha$, that is, the gap disappears in the front gap 17. The toggle means can perform the function of clamping the two molds 1, 3 firmly by means of the tie bars 5. Under the aforegoing condition a desirable molding can be realized. FIG. 4 shows a complete clamping of the two molds 1, 3. When releasing the mold locking, the hydraulic means for the toggle means 11 is actuated in an opposite direction. Whereas the movable plate 4 is moved back, the rear plate 8 is obliged to go ahead.

Figure 5A:
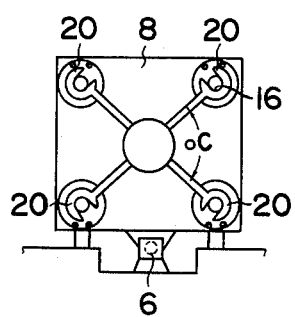
Figure 5:
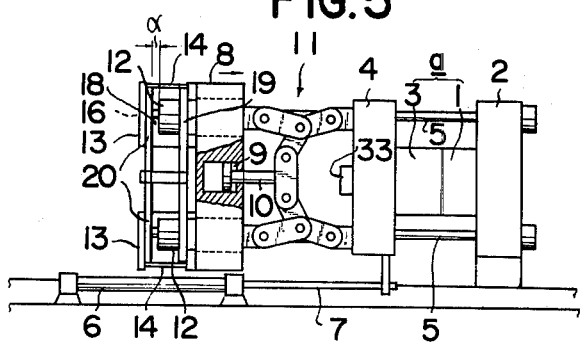
Figure 6A:
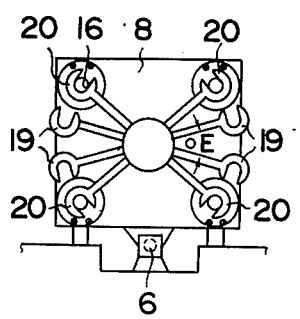
Figure 6:
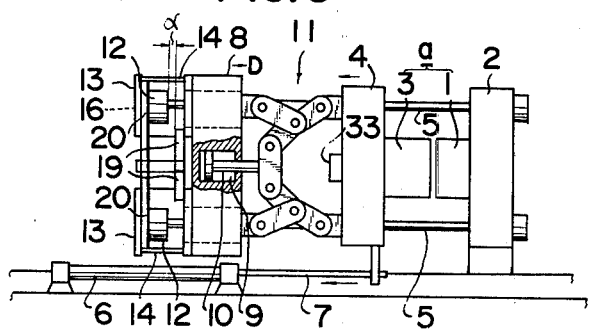

According to FIG. 4 the gap $\alpha$ of the aforementioned formula (I) appears in the rear gap 18, and the thickenss of the rear gap 18 is described as $P_2 + \alpha$. By actuating the piston rod 10 moving in an opposite direction in the hydraulic cylinder 9 the locking plate 20 for the mold opening is inserted in the rear gap 18 by means of the lock actuating rod 22 and the interlocking means 21. On the other hand, the locking plate 19 for the mold locking which was locked in the front gap 17 is released therefrom (see FIGS. 5 to 6).

As described above, when the rear plate 8 moves ahead, the annular supporting panel 13 connecting thereto also moves ahead. Therefore, the gap $\alpha$ in the rear gap 18 disappears and is transferred to the front gap 17. Then, when the rear plate 8 is locked with the tie bars 5 by means of the locking plate 19 for the mold opening, the toggle means 11 brings about the retreat of the movable plate 4, whereby the movable mold 3 is moved very speedily and effectively away from the fixed mold 1. When the toggle means 11 is in a nearly complete release, the piston rod 7 in the cylinder 6 starts to go back, and thereby the locking plate 20 for the mold opening which was locked in the rear gap 18 is freed therefrom. In addition, the mold opening is accelerated by the actuation of the interlocking means 21. Therefore, the complete mold opening illustrated in FIG. 1 can be realized easily. Thus, the mold opening and locking can be carried out alternately and continuously.

Figure 9:
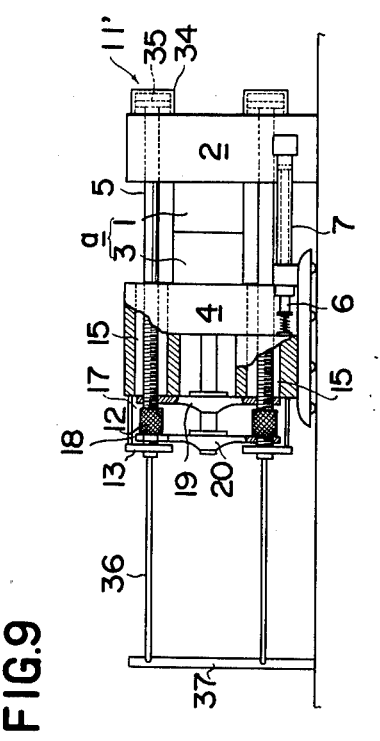
FIG. 9 illustrates a partially cutaway front view of another embodiment of the mold opening and locking mechanism in an injection molding machine or the like and FIG. 9A a side view thereof.
Figure 9A:
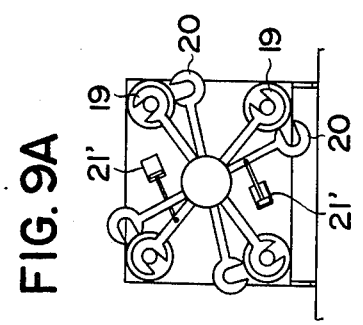

In the embodiment illustrated in FIG. 9 there is no toggle means. Instead, each base end of the four tie bars 5 which pass through four corners of the movable plate 2 is linked with a piston 35 in a cylinder 34 of a directly-pressurized and hydraulically actuated means 11' of a small-sized disc type which is mounted on the fixed plate 2. On the other hand, another free end of each of the tie bars 5 is connected with a horizontal bar 36 supported by a vertical bar 37, and thereby the length of the tie bars 5 can be as short as possible in order to prevent deflection of the tie bars 5. The horizontal bar 36 illustrated in the embodiment of FIG. 9 may be, needless to say, annexed to the tie bars illustrated in the previous embodiment. Since the structure of the embodiment of FIG. 9 is similar to that of the previous embodiment, the same numerals denoted in the previous embodiment are adopted in FIG. 9. The two locking plates 19, 20 are released from the front gap 17 and the rear gap 18 respectively by an actuating means 21' made of a simply-structured piston cylinder. And the two locking plates 19, 20, arranged transversely in relation to each other and fixed axially, are released, through a reciprocal rotation, from the front gap 17 and the rear gap 18 respectively by the actuating means 21'.

Referring to the mold locking in the embodiment of FIG. 9, the locking plate 19 for the mold locking is inserted in the front gap 17, and the movable plate 4 is locked. Then, the two molds 1, 3 are clamped firmly between the fixed plate 2 and the movable plate 4 by the actuation of a directly-pressurized hydraulically-actuated means consisting of the cylinder 34 and the piston 35. Referring to the mold opening, the directly-pressurized and hydraulically-actuated means 11' is released, and the locking plate 20 for the mold opening is inserted in the rear gap 18. Then, the annular supporting panel 13 and the lock adjusting member 12 are locked by actuating the locking plate 20 for the mold opening. On the other hand, the locking plate 19 for the mold locking which was in the locking position is released from the front gap 17. Then, the mold opening can be carried out by the directly-pressurized and hydraulically-actuated means 11'. When the movable mold 3 begins to separate from the fixed mold 1, the movable mold 4 can be located at the furthest distance from the fixed plate 2 by actuating the piston rod 7 in the cylinder 6. In this case, needless to say, the locking plate 20 for the mold opening must be arranged so as to be unable to be locked with the lock adjusting member 12.

In the aforegoing embodiments the two molds 1, 3 are brought into contacted with each other and separated from each other by means of the piston rod 7 in the cylinder 6, but the contacting and the separation can also be carried out by a motor or the like. Further, the structure of the toggle means 11 and hydraulically-actuated means 11' is not always limited to the example described previously. Still further, the structure and function of the locking plates 19, 20 are not always limited to the example described previously.

One of the advantages of the present apparatus is that the mold opening and locking can be carried out by the small-sized toggle means and the hydraulically-actuated means.

For instance a mold locking force of 140 tons is now required in a particular instance. When a stroke of the toggle means is 20mm, and the mechanical advantage 20:1, a small-sized hydraulic means of 7 tons or a twentieth of 140 tons is quite sufficient for the mold locking. In addition, the movable plate is movable by a small-sized hydraulic means for the mold opening and locking which can exert a force of about 2 tons. Thus, the apparatus according to the present invention can be designed in a small size. As a result, consumption of electric power can be reduced.

According to the present invention, a sufficient locking of the two molds can be obtained by locking the tie bars and actuating the toggle means. On the other hand, at the time of the mold opening the usual obstacles to speedy and smooth opening of the molds, such as adhesion properties of a molded article within the molds, can be overcome by locking the the bars. Thus, the mold locking and opening can be attained effectively and speedily.

Further, since the movable plate can be moved back and forth by the piston rod in the cylinder for the mold opening and locking, the stroke of the hydraulically-actuated means can be regulated as necessary regardless of the size of the mold.

It is to be understood that the form of the present invention herein shown and described is to be taken as a preferred example of the same and that various changes in the shape, size and arrangement of parts may be resorted to without departing from the spirit of my invention or the scope of the subjoined claims.

I claim:

1. A mold opening and locking mechanism in an injection molding machine comprising a fixed mold means mounting a first mold half, tie bars extending from said fixed mold means, a movable mold means movable along said tie bars, said movable mold means comprising a mold supporting plate mounting a second mold half, said movable mold means further comprising a rear plate and a toggle means interposed between said rear plate and said mold supporting plate, said movable mold means being movable to an operable position wherein said second mold half is disposed generally in a mating position with said first mold half, a lock member on said tie rods, said rear plate having means defining openings through which said tie rods and said lock member are passable, said toggle means being connected to one side of said rear plate, said lock member being disposed on an opposite side of said rear plate and being spaced from said rear plate to define a space therebetween when said movable mold means is in said operable position, a locking plate means movable into a locking position into said space, said movable mold means further comprising actuating means operable to actuate said toggle means such that said actuating means and said toggle means are operable to forcibly clamp said two mold halves together when said locking plate means is in said locking position and said movable mold means is in said operable position.

2. A mechanism according to claim 1 wherein said actuating means is a hydraulic operated device mounted on said rear plate.

3. A mechanism according to claim 1 wherein said locking plate means is rotatably mounted on said real plate for rotation to a position between said locking position and an unlocking position removed from said space.

4. A mechanism according to claim 1 further comprising means for moving said movable mold means along said tie bars to said operable position.

5. A mechanism according to claim 1 further comprising means for adjusting the position of said lock member on said tie bar.

6. A mechanism according to claim 1 further comprising means operably connected said locking plate means and said actuating means such that actuation of the latter moves said locking plate means into said locking position.

7. A mold opening and locking mechanism in an injection molding machine comprising a fixed mold means mounting a first mold half, tie bars extending from said fixed mold means, a movable mold means movable along said tie bars, said movable mold means comprising a mold supporting plate mounting a second mold half, said movable mold means further comprising a rear plate and a toggle means interposed between said rear plate and said mold supporting plate, said movable mold means further comprising a support panel means connected to and spaced from said rear plate, said movable mold means being movable to an operable position wherein said second mold half is disposed generally in a mating position with said first mold half, a lock member on said tie rods, said lock member being spaced from said rear plate to define a first space therebetween when said movable mold means is in said operable position, said lock member being spaced from said support panel means to define a second space therebetween when said movable mold means is in said operable position, a first locking plate means movable into a locking position into said first space, said movable mold means further comprising actuating means operable to actuate said toggle mens such that said actuating means and said toggle means are operable to forcibly clamp said two mold halves together when said first locking plate means is in said locking position and said movable mold means is in said operable position, and second locking plate means operable to be moved into a position into said second space such that said actuating means and said toggle means are operable to unclamp said mold halves and move said mold supporting plate away from said fixed mold means.

8. A mold opening and locking mechanism in an injection molding machine comprising a fixed mold means mounting a first mold half, tie bars extending from said fixed mold means, movable mold means movable along said tie bars, said movable mold means comprising a mold supporting plate mounting a second mold half, said movable mold means having means defining enlarged openings, said tie bars passing freely through said openings, horizontal bar means connected to the longitudinal ends of said tie bars and disposed axially coextensive with said tie bars, vertically disposed means operable to support said horizontal bar means to thereby provide support for said tie bars, said movable mold means further comprising locking means operable to operably lock said mold supporting plate and said tie bars, and power-operated means operatively connected between said tie bars and said fixed mold means, said power-operated means being operable to apply a clamping force to said tie bars to thereby forcibly clamp said two mold halves together.

* * * * *